US006205282B1

(12) United States Patent
Gaydoul

(10) Patent No.: US 6,205,282 B1
(45) Date of Patent: Mar. 20, 2001

(54) FIBER-OPTIC DEVICE FOR ILLUMINATING A LIGHT PERMEABLE INFORMATION-BEARING MEDIUM, SUCH AS A TRAFFIC, INFORMATION OR ADVERTISING SIGN

(75) Inventor: Ekkehard Gaydoul, Gross-Bieberau (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/196,030

(22) Filed: Nov. 19, 1998

(30) Foreign Application Priority Data

Nov. 26, 1997 (DE) ................................. 197 52 392

(51) Int. Cl.[7] .................................................... G09F 13/18
(52) U.S. Cl. ............................ 385/146; 385/901; 362/31; 362/559; 40/547
(58) Field of Search ..................... 40/547, 546; 362/559, 362/31, 554, 556, 558, 560; 385/901, 146, 120, 121, 147, 115, 31, 33–35; 349/65, 62, 64

(56) References Cited

U.S. PATENT DOCUMENTS

| 3,962,702 | * | 6/1976 | Kriege ............................. 340/815.43 |
| 5,102,227 | * | 4/1992 | Zwirner et al. ...................... 356/384 |
| 5,165,187 | * | 11/1992 | Shahidi-Hamedani et al. ....... 40/547 |
| 5,671,994 | * | 9/1997 | Tai et al. ................................ 362/31 |

FOREIGN PATENT DOCUMENTS

| 42 25 323 C1 | 5/1993 | (DE). |
| 295 08 596 U1 | 9/1995 | (DE). |

OTHER PUBLICATIONS

Handbuch Wechselzeichengeber Nach Dem Schott–System, Mar. 1996.

* cited by examiner

Primary Examiner—Rodney Bovernick
Assistant Examiner—Michael J Stahl
(74) Attorney, Agent, or Firm—Michael J. Striker

(57) ABSTRACT

In order to make traffic signs, information signs or advertising signs sufficiently visible in poor lighting conditions, a self-illuminated system with a fiber-optic lighting device is provided. The signs and billboards to be illuminated include one or more preferably plastic panels functioning as a display device arranged over each other, in which light is propagated from the fiber-optic device parallel to a display plane. Transparent information or signaling entities are provided on or in the panel or panels. In order to improve the quality of the illumination and to lower the manufacturing costs, the fiber-optic device is assembled in a modular manner from a plurality of standardized parts for standard fiber-optic systems according to display system requirements and includes multi-arm light guides, light outlet bodies for the multi-arm light guides acting as optical attachments for adjusting propagation angles for the light so that light intensities over the entire angular range are uniform.

2 Claims, 1 Drawing Sheet

FIBER-OPTIC DEVICE FOR ILLUMINATING A LIGHT PERMEABLE INFORMATION-BEARING MEDIUM, SUCH AS A TRAFFIC, INFORMATION OR ADVERTISING SIGN

BACKGROUND OF THE INVENTION

The invention relates to a fiber-optic device for illumination of a light permeable information-bearing medium, such as a traffic, information or advertising sign, which comprises one or more preferably plastic panels, arranged over each other, operating as a display device, in which the light issuing from the fiber-optic device propagates parallel to a display plane thereof, which have means for two-dimensional or planar light distribution and in front of or on which transparent information entities are arranged.

So that the traffic, information or advertising sign is designed so that it is sufficiently visible in poor lighting conditions (nights, tunnels, eta), self-illuminating systems are increasingly utilized in addition to signs and billboards that are lighted from the outside with headlights. A closed system with a transparent (glass) front panel with interior illumination, preferably by fluorescent lights, is standard according to the state of the art.

The essential disadvantages of this prior art embodiment include the following: problems with water-tightness, susceptibility to vandalism, expensive maintenance and a comparatively uneven or nonuniform optical appearance of the illuminated sign.

On the other hand, fiber-optically illuminated information-bearing media are known which have no weaknesses in regard to the above-described mechanical properties and which also have a clearly improved appearance.

In the fiber-optically illuminated information-bearing medium described in German Patent Document DE 295 08 596 U1 the information bearing-medium to be illuminated comprises one or more plastic panels arranged on each other which are illuminated by fiber-optic means parallel to the display plane. Microstructures in the panels or mechanical modifications in the panels arranged over each other in a multi-panel system, which are typically made of acrylic glass, provide uniform light distribution over the entire panel surface. In microstructured panels the information entities to be illuminated are placed on or in special foils or sheets (e.g. "Diamond Grade" of 3M) that are glued outside on the panels to illustrate the desired information entities.

The fiber-optic component used is designed especially for the dimensions of the display to be illuminated. In most cases a discharge lamp is used as the light source.

In the known embodiments the light guide bundle is directly coupled with its light output ends at the plastic panels. Because of that the penetration depth of the light diffusely leaving the fiber-optic device in the object to be illuminated is limited. Also when the power of the lamp illuminating the fiber-optic components is increased, the light density gradient in the object itself is comparatively large. Further because of that the length of the individual arms of the fiber-optic device is limited, whereby the maintenance of the sign, which must be performed in comparatively inaccessible locations (e.g. over a road), is made more difficult.

Since a unique fiber-optic illumination arrangement is designed and built for each display in the current state of the art, currently such fiber-optic devices are very expensive and have high production costs.

SUMMARY OF THE INVENTION

It is an object of the present invention to provide a fiber-optic device for illumination of an information-bearing medium of the above-described kind in which the light density gradient at comparatively reduced lamp power is clearly reduced, the maintenance for displays in comparatively inaccessible locations is easier and the production costs for the fiber-optic devices are reduced.

According to the invention the fiber-optic device suitable for the various display requirements of various display devices is assembled in a modular manner from standardized parts of a standardized fiber-optic system with standardized different multi-arm light guides, and light outlet bodies acting as optical attachments that adjust the beam or propagation angle of the light issuing from them to provide light intensities of greater uniformity over an entire angular range are arranged in or on the individual arms of the fiber optic systems.

Use of optical attachments in front of the individual arms of the light guide bundle causes a greater direct penetration depth of the light leaving the fiber-optic device in the object to be illuminated. Because of that a reduction of the power of the light source is advantageously possible and also the light density gradient in the object is clearly reduced.

The optical attachment is preferably a light outlet body for fiber-optic light guides according to German Patent Document DE 42 25 323 C1, in which a tapered extension section whose jacket and/or end surfaces forms the light outlet surface is connected to the light outlet end surface.

The best illumination characteristics are obtained when this light outlet body has a truncated conical central region connected to a conically tapered extended section. The extended section can also be in the form of a pyramid, a cone or a truncated pyramid of similar form.

The optical attachment comprising a front-standing device causes an adjustment of the light propagation angle to provide more uniform light intensities over the entire angular range, whereby the advantages described herein were obtained. Furthermore the information provided in the above-described DE document extends the disclosure of the present invention by reference.

The improved optical properties allow the use of individual arms of a longer length in the fiber-optic component and thus a simplified maintenance of the illumination device, also of signs, which are mounted in inaccessible locations.

The increase of the light yield through the optical attachment is also so large that the sign or the billboard can be operated with a halogen reflector lamp with a maximum of only 50 watts of power. An economical production (price per piece about 30% less than comparable state-of-the-art fiber-optic systems) is possible by use of standard systems for mass-producing the fiber-optic device. The adjustment to specific display specifications occurs by variation of the number of standard parts employed, its arm number and the characteristics of the optical elements. Typically about 120 individual arms are sufficient for illumination of 1 $m^2$ of display surface.

If the specific illumination device is assembled in a modular manner like standard fiber-optic systems from its standard components, it can be used for a variable signal sign with fiber-optics as described in the Schott handbook "Variable signs according to the Schott System" of March 1996.

This standard system comprises light sources or illuminating elements, filters and light guides with optical attachments.

The light sources are the central component of the system. The reflector lamp, the only part of the system that wears out, the light guides and if necessary colored filters, are assembled in it in a compact manner. They are so constructed that a uniform illumination of the light guide ends is guaranteed. If the light sources contain an illumination element, a simple device comprising a safety circuit with a reserve lamp may be provided, so that the system can operate with unchanging light engineering properties during failure of the main lamp.

These light sources can be operated with a light distributor to provide light simultaneously to two light guides. Because of that the required number of reflector lamps and the required electrical equipment is reduced.

In regard to the light guides with an optical attachment the standard system has a number of light guides which differ in the number of individual arms, the length of the light guides and the propagation characteristics/propagation angle of the optical attachments. Thus the system contains 20, 40, 60, 80, 100, 105 and 120-arm light guide arms of different standard lengths as standard components, among others with an active individual arm diameter of from 1.0 to 1.5 mm.

BRIEF DESCRIPTION OF THE DRAWING

The objects, features and advantages of the invention will now be illustrated in more detail with the aid of the following description of the preferred embodiment, with reference to the accompanying sole FIGURE showing a diagrammatic view of a fiber-optic device for illuminating a light permeable information-bearing medium according to the invention in which the information-bearing medium bears the letters "ABC . . . " and digits "0123 . . . " as displayed information entities.

DESCRIPTION OF THE PREFERRED EMBODIMENTS

Figure 1:
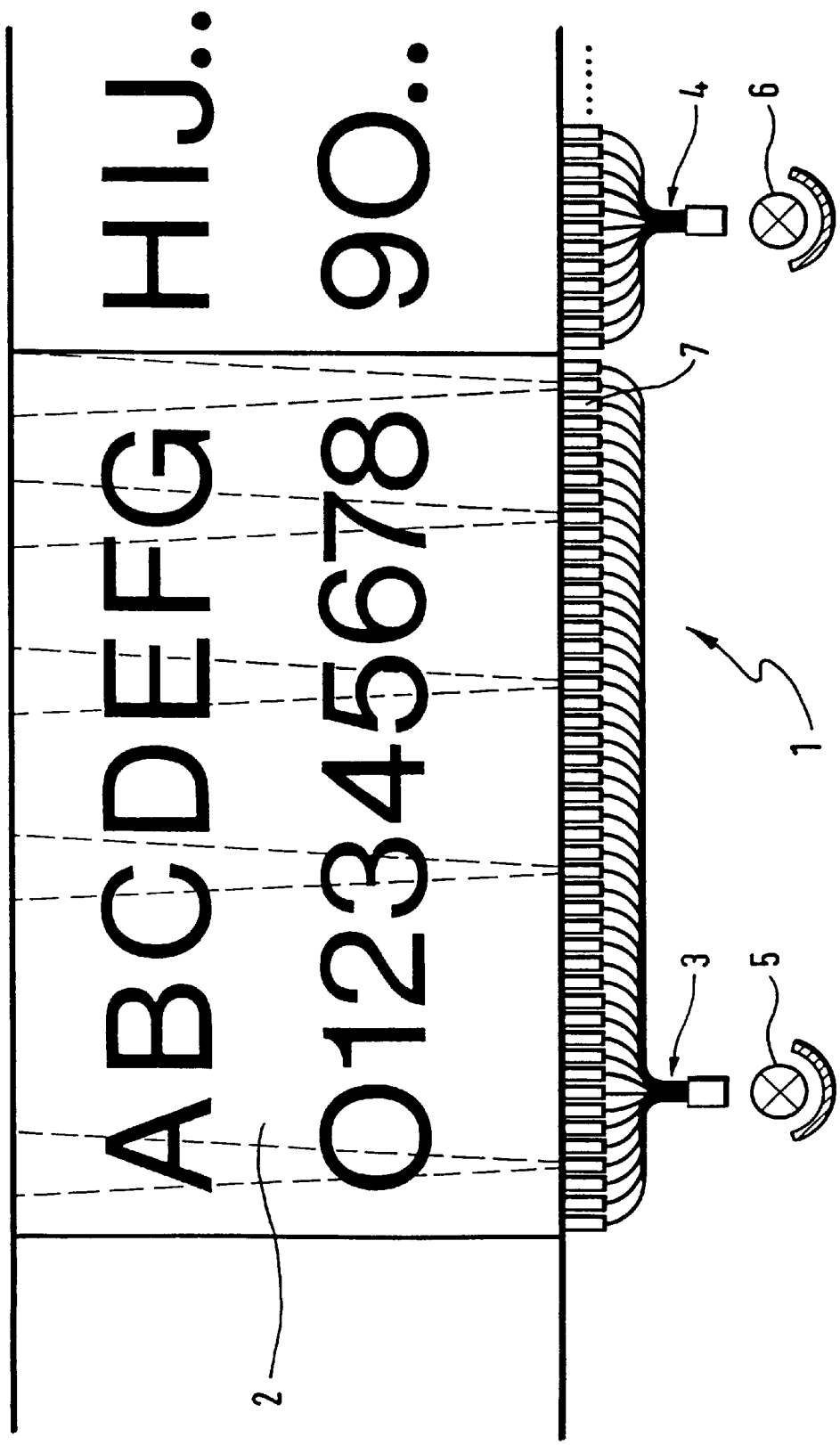

The fiber-optic device 1 shown in the drawing is assembled in a modular manner from two standardized modules 3 and 4 of a standard fiber-optic system. The number of modules is chosen according to the display system requirements. Each module 3,4 has an illuminating lamp 5 or 6 respectively and includes a plurality of multi-arm guides and light outlet bodies 7 for multi-arm light guides acting as optical attachments for adjusting propagation angles for light from the lamps 5 and 6, so that light intensities over an entire angular range are uniform.

The light outlet bodies 7 can be constructed according to the disclosure in the above-mentioned German Patent Document DE 42 25 323 C1.

The light outlet bodies 7 are coupled to the display device 2 in such a manner that the light propagates parallel to the display plane thereof. The display device has means for distributing light in the display plane so that the entire display area is uniformly illuminated in a known manner.

The fiber-optic devices comprise glass fibers or fibers made of plastic material.

The disclosure in German Patent Application 197 52 392.7-32 of Nov. 26, 1997 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a fiber-optic device for illumination of a light permeable information-bearing medium, such as a traffic, information or advertising sign, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims: cm I claim:

1. A fiber-optic device for illuminating a light permeable information-bearing medium comprising at least one panel operating as a display device, in which light propagates parallel to a display plane thereof from the fiber-optic device, which has means for distributing light in the display plane and on which transparent information entities are mounted;

wherein said fiber-optic device comprise a plurality of standardized modules (3,4) according to display requirements;

wherein said fiber-optic device a comprises a plurality of multi-arm light guides and respective light outlet bodies for said multi-arm light guides acting as optical attachments for said multi-arm light guides; and wherein said light outlet bodies comprise means for adjusting propagation angles for the light passing from the multi-armlight guides into the at least one panel, so that light intensities over an entire angular range of said propagation angles are uniform; and wherein said light outlet bodies each have a truncated conical central portion and a conically tapered extended section connected to said central portion, said conically extended section having an end surface providing a light outlet surface for the light passing therethrough;

whereby the light is distributed uniformly in the display plane in the at least one panel.

2. The fiber-optic device as defined in claim 1, wherein the display device is a traffic, information or advertising sign and said at least one panel consists of a plurality of flat plastic members placed one over the other.

* * * * *